(12) United States Patent
Schmitt et al.

(10) Patent No.: US 10,508,322 B2
(45) Date of Patent: Dec. 17, 2019

(54) COPPER ALLOY, USE OF A COPPER ALLOY, BEARING HAVING A COPPER ALLOY, AND METHOD FOR PRODUCING A BEARING COMPOSED OF A COPPER ALLOY

(71) Applicant: FEDERAL-MOGUL WIESBADEN GMBH, Wiesbaden (DE)

(72) Inventors: Holger Schmitt, Pfungstadt (DE); Daniel Meister, Mainz-Kostheim (DE); David M. Saxton, Ann Arbor, MI (US)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 788 days.

(21) Appl. No.: 14/890,002

(22) PCT Filed: May 8, 2014

(86) PCT No.: PCT/EP2014/059441
§ 371 (c)(1),
(2) Date: Nov. 9, 2015

(87) PCT Pub. No.: WO2014/180951
PCT Pub. Date: Nov. 13, 2014

(65) Prior Publication Data
US 2016/0102386 A1    Apr. 14, 2016

(30) Foreign Application Priority Data
May 8, 2013    (DE) .................. 10 2013 208 497

(51) Int. Cl.
*C22C 9/06*    (2006.01)
*B22F 1/00*    (2006.01)
(Continued)

(52) U.S. Cl.
CPC .............. *C22C 9/06* (2013.01); *B22F 1/0059* (2013.01); *B22F 7/008* (2013.01); *C22C 1/1036* (2013.01);
(Continued)

(58) Field of Classification Search
CPC .... C22C 9/00; C22C 9/02; C22C 9/06; C22C 32/0005; C22C 32/0021; C22C 32/0084;
(Continued)

(56) References Cited
U.S. PATENT DOCUMENTS

| 4,941,919 A | 7/1990 | Asada et al. |
| 5,303,617 A | 4/1994 | Asada et al. |

(Continued)

FOREIGN PATENT DOCUMENTS

| CN | 1493420 A | 5/2004 |
| CN | 1718795 A | 1/2006 |

(Continued)

OTHER PUBLICATIONS

International Search Report, dated Nov. 10, 2014 (PCT/EP2014/059441).

(Continued)

*Primary Examiner* — Keith Walker
*Assistant Examiner* — John A Hevey
(74) *Attorney, Agent, or Firm* — Robert L. Stearns; Dickinson Wright, PLLC

(57) ABSTRACT

The invention relates to a copper alloy such as, for example, CuNi6Sn5Fe2P0.15, which has hard particles such as, for example, Fe3P or Fe2P and optionally solid lubricants such as, for example, hexagonal boron nitrides or graphite. The invention further relates to the use of said copper alloy for a bearing and to a bearing having said copper alloy. The invention further relates to a method for producing a bearing having a copper alloy, wherein a metal powder is produced, (Continued)

for example, by means of melt atomization, hard particles and optional solid lubricants are optionally added to said powder, and the powder is sintered onto a substrate. Finally, the invention relates to an alternative method for producing a bearing, wherein the copper alloy is applied to a substrate by means of casting or plating or wherein the bearing is made completely of the copper alloy.

9 Claims, 2 Drawing Sheets

(51) Int. Cl.
| | |
|---|---|
| C22C 9/00 | (2006.01) |
| C22C 9/02 | (2006.01) |
| C22C 32/00 | (2006.01) |
| C22C 1/10 | (2006.01) |
| C22C 26/00 | (2006.01) |
| F16C 33/12 | (2006.01) |
| B22F 7/00 | (2006.01) |
| F16C 33/10 | (2006.01) |

(52) U.S. Cl.
CPC ............ *C22C 1/1084* (2013.01); *C22C 9/00* (2013.01); *C22C 9/02* (2013.01); *C22C 26/00* (2013.01); *C22C 32/0005* (2013.01); *C22C 32/0021* (2013.01); *C22C 32/0052* (2013.01); *C22C 32/0068* (2013.01); *C22C 32/0084* (2013.01); *F16C 33/12* (2013.01); *F16C 33/121* (2013.01); *F16C 33/125* (2013.01); *C22C 2026/001* (2013.01); *C22C 2026/002* (2013.01); *C22C 2026/003* (2013.01); *F16C 33/1095* (2013.01)

(58) Field of Classification Search
CPC ...... C22C 1/1084; B22F 7/008; B22F 1/0059; F16C 33/1095
See application file for complete search history.

(56) References Cited

U.S. PATENT DOCUMENTS

| | | | |
|---|---|---|---|
| 6,165,246 A * | 12/2000 | Kira | C22C 9/00 428/545 |
| 2003/0064239 A1 | 4/2003 | Saitou et al. | |
| 2004/0071374 A1 | 4/2004 | Tomita et al. | |
| 2006/0091792 A1 | 5/2006 | Kugimiya et al. | |
| 2006/0219328 A1 | 10/2006 | Grohbauer et al. | |
| 2007/0258668 A1 | 11/2007 | Shimizu et al. | |
| 2009/0010797 A1 | 1/2009 | Aruga et al. | |
| 2011/0129173 A1 | 6/2011 | Yokota et al. | |
| 2012/0049130 A1 * | 3/2012 | Aoyama | C22C 9/02 252/513 |
| 2012/0141057 A1 | 6/2012 | Schmitt et al. | |
| 2013/0139390 A1 | 6/2013 | Schmitt et al. | |
| 2014/0086784 A1 | 3/2014 | Schmitt et al. | |
| 2014/0352495 A1 | 12/2014 | Ishii | |
| 2014/0363570 A1 | 12/2014 | Schmitt et al. | |

FOREIGN PATENT DOCUMENTS

| | | |
|---|---|---|
| CN | 101018878 A | 8/2007 |
| DE | 102005014302 A1 | 10/2006 |
| DE | 102007049383 A1 | 4/2009 |
| DE | 102009002894 A1 | 11/2010 |
| DE | 102011007362 A1 | 10/2012 |
| DE | 102011087798 B3 | 4/2013 |
| EP | 0962541 A1 | 12/1999 |
| JP | S63312933 A | 12/1988 |
| JP | H03247732 A | 11/1991 |
| JP | H0499836 A | 3/1992 |
| JP | 2005133736 A | 5/2005 |
| JP | 2012526195 A | 10/2012 |
| WO | 2008140100 A1 | 11/2008 |
| WO | 2010128076 A1 | 11/2010 |
| WO | 2011154039 A1 | 12/2011 |
| WO | 2013129226 A1 | 9/2013 |

OTHER PUBLICATIONS

CuFe2P Material Data Sheet, Deutsches Kupferinstitut, pp. 1-10.
Wieland-K65 High-copper alloy Data Sheet, Wieland-Werke AG.

* cited by examiner

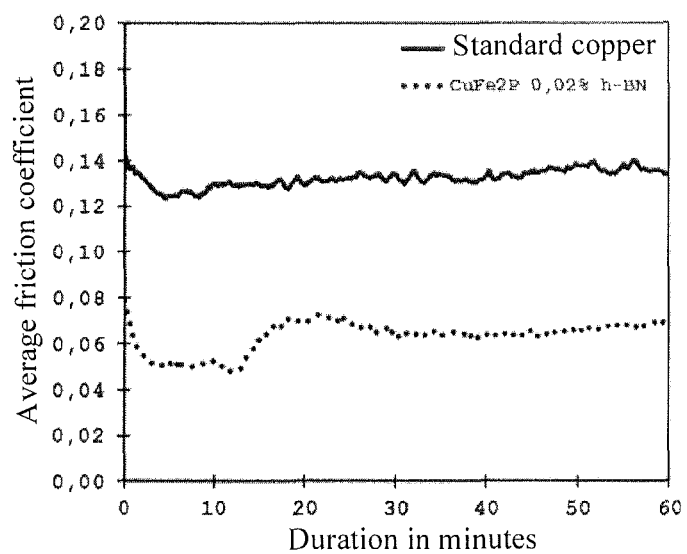

COPPER ALLOY, USE OF A COPPER ALLOY, BEARING HAVING A COPPER ALLOY, AND METHOD FOR PRODUCING A BEARING COMPOSED OF A COPPER ALLOY

BACKGROUND OF THE INVENTION

1. Technical Field

The present invention relates to a copper alloy, which comprises hard particles and optionally solid lubricants, the use of said copper alloy for a bearing, a bearing made of said copper alloy, and a method for producing said bearing.

2. Related Art

Lead-free copper alloys comprising iron and phosphorus are known as high-performance materials in electrical engineering.

For instance, US 2009/0010797 A1 discloses a strip made of a copper alloy, which is essentially an alloy of the Cu—Fe—P type comprising 0.01 to 3.0% by weight of Fe and 0.01 to 0.3% by weight of P, and may further comprise small amounts of Zn, Sn, Mn, Mg and Ca. The aim is to provide a material having high electrical conductivity, high strength and good flexibility, for instance for use in circuit boards.

US 2006/0091792 A1 discloses thin films made of a copper alloy, which comprises Fe and P and is used in flat screens. Furthermore, a sputter substrate for the production of corresponding thin films is provided.

Furthermore, the material data sheet "CuFe2P" of the German Copper Institute (*Deutsches Kupferinstitut*) as well as the data sheet regarding "*Wieland-K*65" describe corresponding copper alloys for electronic components.

However, copper alloys are also widely used in bearing materials and sliding elements e.g. in the form of "bearing bronzes". The wear resistance of these alloys can be increased e.g. by precipitation hardening in an alloy system specifically selected for this purpose or by adding hard materials.

In this regard, DE 10 2007 049 383 A1 describes a composite material, in particular a friction composite material, which comprises a substrate material of a steel material and a layer of a copper alloy. The aim is to provide a material that can easily be formed into a molded part and comprises a wear-resistant friction layer. The wear resistance is achieved in that the copper alloy of the layer consists of a hardenable copper alloy e.g. CuNiSi, CuNiSiMg, Cu—Cr, Cu—Fe, Cu—(Fe, Co, Ni)—P, CuBe or CuMg. As substrate material, carbon steel, heat-resistant steel, case-hardened steel or nitrided steel can be used for instance. Furthermore, a method for producing the composite is described, in which the copper alloy is roll-plated as a film onto the substrate material and goes through various heat treatments. The wear-resistant surface is created only after forming the composite into a friction body by precipitation hardening.

DE 10 2005 014 302 A1 describes a method for producing a sliding bearing as well as a sliding bearing as such with the object of providing particularly favorable sliding surfaces. This is achieved by etching processes, in which specific phases are selectively dissolved out of the material of the sliding surface, and other phases remain on the surface. For this purpose, copper multicomponent alloys having at least two different phase constituents in the structure are used. These phases can be formed via precipitation. Copper aluminum multicomponent bronzes, which can contain Fe, Ni, Mn, Zn and Si, as well as CuAl13Fe4, 5CoMn, CuAl15Fe4, 5CoMn and CuAl10Ni5Fe4 are stated as examples of suitable materials. Depending on the choice of acid for etching, it can be determined whether harder or softer phases remain on the surface, which allows an adjustment to the intended use of the sliding element. The created etching structure further allows that a wear-reducing lubricant reservoir can be formed.

EP 0 962 541 A1 describes a sintered, copper-based sliding material which is characterized by the addition of hard material particles of medium and high hardness. Pure copper or copper alloys are suggested as basic material. Cu—Ag base alloys or Cu—Pb—Ag base alloys can be used as copper alloys. Further, these alloys can comprise up to a total of 50% by weight of the following additives: Ni, Sn, P, Al, Si, Bi, Mn, Zn, Fe and Sb. The sliding material achieves good sliding properties and, at the same time, good processability by the specific addition of particles of great hardness from the group of metallic oxides, borides, carbides and nitrides and particles of medium hardness such as e.g. $Fe_3P$, $Fe_2P$, $Fe_3B$, $TiSi_2$, $ZrSi_2$ or NiP. The particles of high hardness are added in an amount of 0.01 to 15% by weight and with average particle diameters of 0.5 μm or more. The particles of medium hardness are added in an amount of 0.5 to 20% by weight and with average particle diameters of 50 μm or less.

The bearing material itself is produced by mixing a copper-containing powder, which was created e.g. by atomization, with the hard material particles, by subsequent spreading on a steel strip and sintering.

WO 2008/140100 A1 discloses a lead-free, copper-based sliding material which comprises an Ag—Bi eutectic and further the elements Ni, P, Zn as well as 1 to 10% by weight of hard material particles from the group of $Fe_3P$, $Fe_2P$, FeB, NiB and AlN with average grain sizes of 1.5 to 70 μm.

DESCRIPTION OF THE INVENTION

An object of the present invention is to provide an improved copper alloy.

The alloy according to the invention is a copper alloy comprising hard particles and optionally solid lubricants as well as the following alloy elements:

nickel (Ni) up to approximately 10, preferably up to approximately 8, and more preferably up to approximately 6% by weight;

tin (Sn) up to approximately 10, preferably up to approximately 8, and more preferably up to approximately 6% by weight;

iron (Fe) up to approximately 10, preferably up to approximately 5, and more preferably up to approximately 3 and even more preferably up to approximately 2% by weight;

phosphorus (P) from approximately 0.01 up to approximately 5, preferably up to approximately 3, and more preferably up to approximately 0.5% by weight;

optionally aluminum (Al) up to approximately 10, preferably up to approximately 7, and more preferably up to approximately 2% by weight;

optionally zinc (Zn) up to approximately 5, preferably up to approximately 3, and more preferably up to approximately 1% by weight; and as balance copper (Cu) and inevitable impurities.

In this regard, the above-stated concentration ranges which only have an upper limit are to be understood such that the corresponding element is contained in a significant concentration in the alloy. A concentration above the usual impurity level of comparable copper alloys can be assumed as the respective, lower limit. This is, for instance, with regard to individual elements<approximately 0.01% by weight, with the sum of all impurity elements being<approximately 0.2% by weight.

Copper alloys as such are particularly suited for bearing applications owing to their structural configuration and their physical properties. The presence of hard (material) particles improves the properties of the copper alloy further in that the strength of the alloy matrix is increased and the abrasion resistance is improved, as becomes apparent from the comparison of different copper alloys in FIG. 1. Furthermore, as shown in FIG. 2, optionally present solid lubricants improve the slidability of the alloy by reduction of the friction conditions. All in all, the alloy according to the invention is characterized, e.g. as compared to the conventional lead-free sinter materials CuSn8Ni1 and CuSn10Bi3, 5, by a significantly improved corrosion resistance and, at the same time, high fatigue strength and better sliding properties. The improvement of the fatigue strength is also due to the higher thermal conductivity of the described alloy. Thus, the heat created during use can be dissipated better and the thermal load is reduced.

The fine adjustment of the contents of the alloy elements allows a specific adjustment of the alloy properties to different conditions of use of the copper alloy, in particular with regard to corrosion resistance, fatigue strength, sliding properties and the interaction with the added hard (material) particles and optional solid lubricants. Thus, the addition of nickel, for instance, in the given concentration range improves the corrosion resistance. This may lead to a higher concentration of nickel on the material surface. The thus formed layer effectively prevents pitting and/or surface corrosion. Iron and phosphorus form additional hard particles which increase abrasion resistance. Tin increases the hardness of the matrix. Optional aluminum and zinc increase corrosion resistance, just as nickel.

As regards the above-stated concentration ranges, the following copper alloys are particularly preferred: CuNi6Sn5Fe2P0.15, comprising approximately 5.5 up to approximately 6.4% of Ni, approximately 4.5 up to approximately 5.4% of Sn, approximately 1.5 up to approximately 2.4% of Fe, approximately 0.145 up to approximately 0.154% of P and as balance copper (Cu) and inevitable impurities, as well as CuSn5Ni4Fe2P0.15, comprising approximately 4.5 up to approximately 5.4% of Sn, approximately 3.5 up to approximately 4.4% of Ni, approximately 1.5 up to approximately 2.4% of Fe, approximately 0.145 up to approximately 0.154% of P and as balance Cu and inevitable impurities. These preferred alloys exhibit an advantageous compromise between hardness (tin content) and corrosion resistance (nickel content) and are particularly suited for high-performance connecting-rod bushings. Less tin leads to a lower fatigue strength for the use as connecting-rod bushing. Less nickel, on the other hand, reduces the corrosion resistance of the alloy whereas more nickel merely increases the alloy costs, but hardly contributes to a further increase of the corrosion resistance.

Preferably, the hard particles contained in the copper alloy comprise oxides, carbides and/or nitrides, e.g. c-BN, $SiO_2$, $Al_2O_3$, $ZrO_2$, SiC and/or $Si_3N_4$. Intrinsically formed hard particles, e.g. Fe—P hard particles, are also possible. The hard particles are characterized by a hardness that is greater than the hardness of the alloy matrix, and thus increase the wear resistance of the material in its entirety. Further, it is advantageous to embed particles of high hardness into a comparatively soft matrix, such as e.g. the copper alloy according to the invention, since this can optimally compensate the forces acting on the particles, and reliably embeds the particles.

Furthermore, it is preferred that the hard particles have a particle size of less than approximately 15 µm. The preferred size range of the particles represents an optimal compromise between a good dispersion of said particles in the alloy matrix and an optimal increase of abrasion resistance and matrix strength. The lower limit of the particle size is approximately 100 nm. If the particles are too large, i.e. larger than approximately 15 µm, they will damage the bearing and are driven out of the lubrication gap. If the particles are smaller than approximately 100 nm, the strength increase prevails as compared to the abrasion resistance. Depending on the weight proportion, however, a polishing effect can occur that damages the counter-component of the bearing. Very fine particles, on the other, tend to agglomerate owing to strong adhesion forces. This mechanism is enhanced when the particle size is reduced. An even distribution is, however, necessary for an optimal effect of the particles. This is achieved by milling and mixing processes. However, at a certain lower limit of the grain size, the milling and shear forces are not sufficient anymore to distribute the additives evenly in the alloy matrix and to prevent agglomeration.

It is further preferred that the copper alloy comprises up to approximately 10% by weight of hard particles and/or up to approximately 10% by weight of solid lubricants. Firstly, the content of hard particles ensures that sufficient hard particles are present to achieve a measureable improvement of the abrasion resistance and matrix strength. Secondly, it is guaranteed that the advantageous properties of the alloy matrix are not changed disadvantageously owing to a too high content of hard particles. Furthermore, the preferred concentration range allows a specific adjustment of the material properties. Depending on the specific requirements in a field of use, a higher or lower content of hard particles in the copper alloy can be set. For instance, a value of 0.01% by weight each or a sum of 0.2% by weight can be assumed as lower limit for the content of hard particles.

The solid lubricants optionally present in the copper alloy are preferably hexagonal boron nitride (h-BN) and/or graphite. The content thereof according to the invention ensures that the desired reduction of the friction conditions is achieved, but on the other hand mechanical weakening and reduction of the wear resistance owing to too high contents is avoided. Both materials, h-BN and graphite, are excellent lubricants owing to their atomic structure, which can be incorporated into the copper alloy for permanent lubrication, and allow the setting of optimal sliding properties. In particular, h-BN is characterized by a high temperature resistance and oxidation resistance, and thus maintains its good lubrication properties over a wide temperature range.

Finally, it is preferred that the copper alloy is lead-free. In particular as regards environmental friendliness and questions of recycling, it is advantageous to forgo lead which is detrimental to the environment.

As already described, the good intrinsic properties of the copper alloy with regard to wear and sliding properties are further improved by the incorporation of hard particles and optional solid lubricants. Thus, the alloy according to the invention is very well suited for the use in bearings, e.g. in bushings, in particular connecting-rod bushings, and in sliding elements. Consequently, it is also advantageous to provide a bearing comprising the described copper alloy. It is evident from the above-stated preferred embodiments of the copper alloy that the alloy is highly adjustable to different conditions of use of the bearing. By setting the contents of alloy elements, hard particles and solid lubricants, e.g. a bearing having high hardness and resistance can be provided or a bearing having particularly optimized sliding properties.

The method according to the invention comprises the production of the metallic powder, optionally the admixture of hard (material) particles and optional solid lubricants to this powder, optionally producing intrinsic hard particles in the copper alloy, optionally, between a first sintering step and a second sintering step, an infiltration step of an alloy element, preferably aluminum, and sintering the mixed powder onto a substrate.

Thus, via a sintering process, a substrate coated with the advantageous copper alloy is formed, from which the bearing can be manufactured. Via different mixing and milling units, a powder can be produced that is optimally configured for the subsequent sintering process. Furthermore, the hard particles and optional solid lubricants (optionally also other alloy elements) can thus be added in an easily controllable manner, and their homogeneous distribution in the mixed powder and later in the copper alloy can be ensured. Alternatively, it is also possible, however, to produce the hard particles intrinsically, i.e. by metallurgic processes within the copper alloy. This is conceivable e.g. in the presence of Fe and P, whereby Fe—P hard particles can be formed directly in the copper alloy, and an external addition of hard particles is not absolutely necessary, but may be carried out optionally nevertheless. The sintering process with the corresponding production of a mixed powder turns out to be advantageous in that the addition of functional particles (hard particles and optional solid lubricants) can be controlled in a particularly easy manner, and problems with the distribution thereof can be avoid as compared to a melting process. Furthermore, the obtained material does not require any subsequent rolling or heat treatment steps, which is associated with the entire process being shortened.

Preferably, the production of the metallic powder is carried out by melt atomization. This atomization process results in a pre-alloyed powder that can be further processed in the subsequent steps. For instance, a CuNiFePSn powder can be produced that is not prone to passivation and can be used without the addition of further sintering aids. By atomization, an increased fine proportion (<5 µm) can also be achieved in the metallic powder, and thus the sintering temperature can be advantageously reduced. Furthermore, the atomization in principle allows the use of pure elements, and thus makes it possible to minimize the costs for the used materials.

Furthermore, it is preferred that alloy elements, e.g. optional aluminum, are added only after melt atomization. Zinc and aluminum form refractory oxides which passivate the sintering powders if they have already been added to the alloy in the melt atomization. On the other hand, a separate addition of element powders means that these can be sintered better.

As regards the optional infiltration process, in the first sintering step a porous matrix is created, into which an alloy powder is introduced. In the subsequent second sintering step, the corresponding alloy element flows/diffuses into the matrix. The advantage of this infiltration step is that the alloy element is thereby very evenly distributed in the alloy.

Finally, it is preferred that the substrate, onto which the mixed powder is sintered, is a metal strip, preferably a steel strip. Steel is a versatile and technologically very well described material, and is widely used a basic material e.g. for sliding elements. The described copper alloy forms a good bond with the steel basic material, and the composite of metallic substrate and copper alloy, as produced by the method according to the invention, can be further processed into a high-performance bearing with conventional methods.

Accordingly, apart from sintering, the described copper alloy can also be applied onto a basic material from the melted stated or be plated onto a basic material as a film. Furthermore, it is possible to provide a bearing completely of the described copper alloy. For this purpose, said copper alloy is casted, optionally heat-treated, rolled and further processed into a bearing.

If appropriate, the alternative methods can avoid the production of the bearing via a sintering step with the accordingly necessary production of a powder. Furthermore, it is possible to produce the bearing completely of the copper alloy. These alternative methods allow the production of a bearing of the particularly advantageous copper alloy according to the invention with already existing production means that are optimally established and well known as regards their technical details. Thus, the bearings can be realized with a relatively short lead time and test period and at optimized cost.

BRIEF DESCRIPTION OF THE FIGURES

FIG. 2 shows a comparison of average friction coefficients of a sliding element comprising a copper alloy with and without the addition of solid lubricants depending on the test duration.

WAYS OF IMPLEMENTING THE INVENTION

Figure 1:
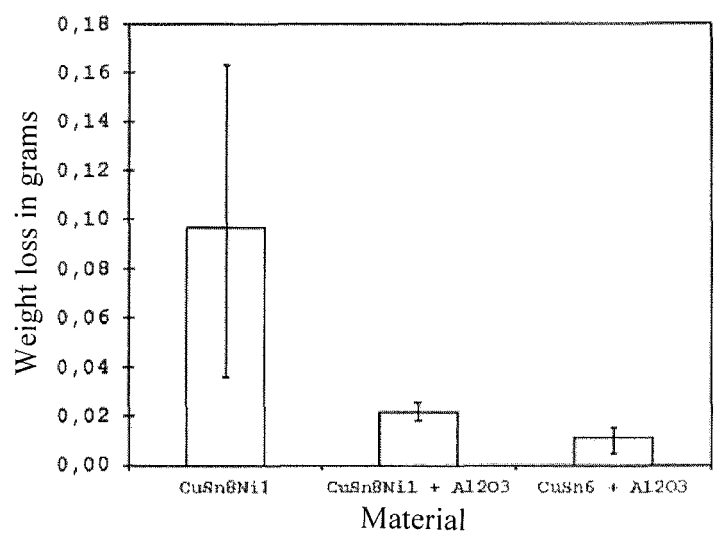
FIG. 1 shows a comparison of average weight losses of three copper alloys with and without the addition of hard material particles in a wear test device.

To test the sliding and fatigue properties of copper alloys comprising hard particles and/or solid lubricants, different tribological tests were carried out.

In FIG. 1, it is shown how the wear resistance of Cu alloys is evidently improved by the addition of hard particles, e.g. oxides, as becomes apparent from the comparison of the left bar with the bar in the middle. Furthermore, synergistic effects can be achieved if the alloy matrix is moreover varied. By increasing the strength of the alloy and, at the same time, adding hard particles, the sliding elements have a further increased fatigue strength and abrasion resistance, as becomes apparent from the comparison of the bar in the middle with the right bar.

In FIG. 2, it is shown that the incorporation of solid lubricants, such as e.g. h-BN, reduces the friction of sliding elements, and the sliding properties are significantly improved. The upper graph indicating high friction coefficients represents a standard copper alloy. The addition of h-BN causes a shift towards significantly lower average friction coefficients, as illustrated by the lower graph, which impressively substantiates the efficacy of the solid lubricants.

The invention claimed is:

1. A copper alloy comprising hard particles, the copper alloy having the following alloy elements:
approximately 5.5 up to approximately 6.4%, by weight, of nickel (Ni), approximately 4.5 up to approximately 5.4%, by weight, of tin (Sn), approximately 1.5 up to approximately 2.4%, by weight, of iron (Fe), approximately 0.145 up to approximately 0.154%, by weight, of phosphorous (P) and as balance copper (Cu) and inevitable impurities; or approximately 4.5 up to approximately 5.4%, by weight, of Sn, approximately 3.5 up to approximately 4.4%, by weight, of Ni, approximately 1.5 up to approximately 2.4%, by weight, of Fe, approximately 0.145 up to approximately 0.154%, by weight, of P, and as balance copper (Cu) and inevitable impurities; and in which all of the hard particles of the copper alloy consist of intrinsically formed Fe—P.

2. The copper alloy according to claim 1, in which the hard particles have particle sizes of less than approximately 15 μm.

3. The copper alloy according to claim 1, which comprises up to approximately 10% by weight of the hard particles and up to approximately 10% by weight of solid lubricants.

4. The copper alloy according to claim 3, in which the solid lubricants comprise hexagonal boron nitride (h-BN) and/or graphite.

5. The copper alloy according to claim 1, wherein the copper alloy is lead-free.

6. A bearing comprising a copper alloy according to claim 1.

7. The copper alloy according to claim 1, including solid lubricants, aluminum (Al) up to approximately 10% by weight, and zinc (Zn) up to approximately 5% by weight.

8. The copper alloy according to claim 7, wherein the aluminum (Al) is present in an amount of up to approximately 7% by weight, and zinc (Zn) up to approximately 3% by weight.

9. The copper alloy according to claim 7, wherein the aluminum (Al) is present in an amount of up to approximately 2% by weight, and zinc (Zn) up to approximately 1% by weight.

* * * * *